Feb. 23, 1943. T. J. WATSON 2,312,137
JOB COST RECORDER
Filed Aug. 30, 1941 5 Sheets-Sheet 1
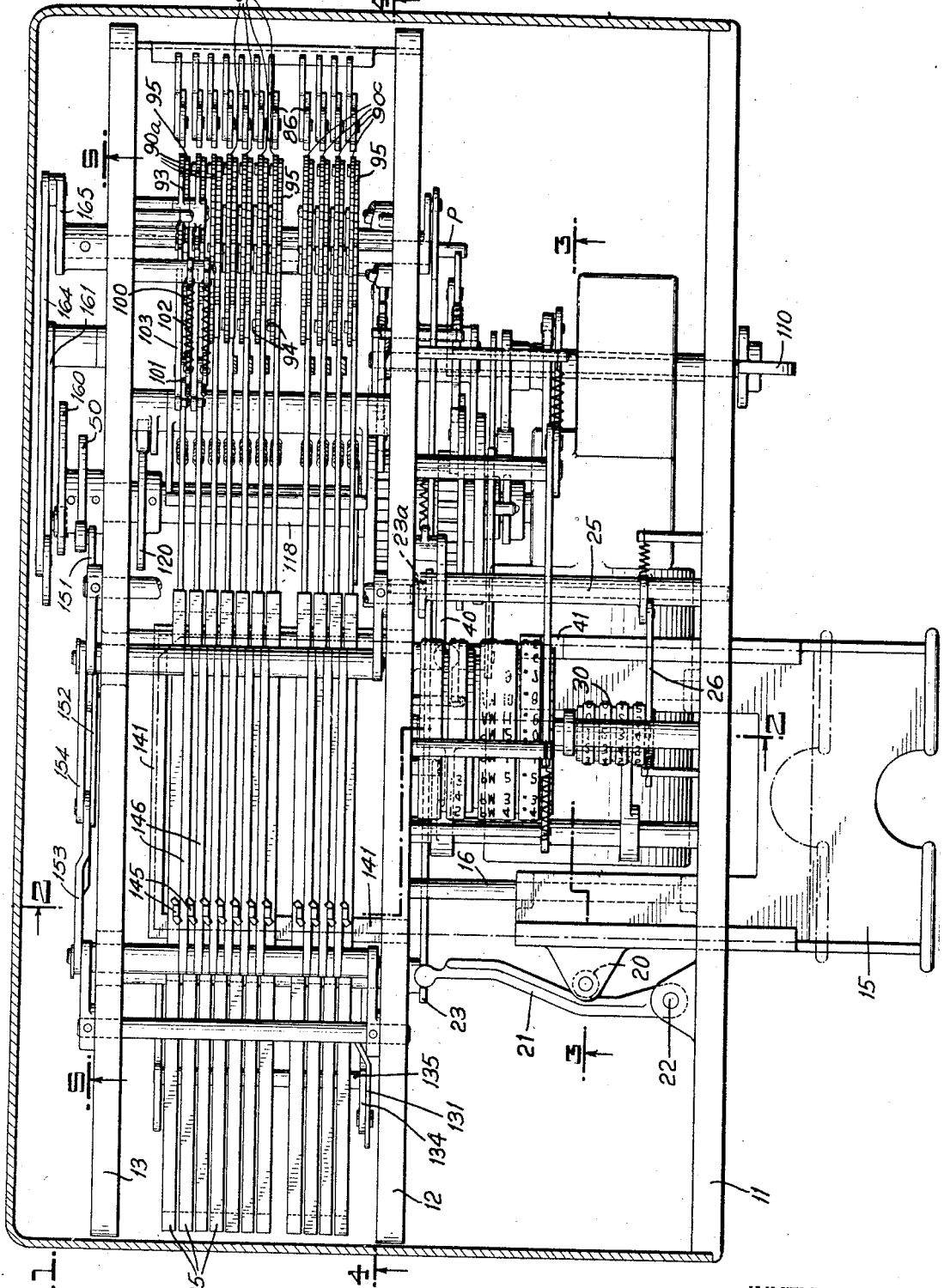
INVENTOR
Thomas J. Watson
BY
W. M. Wilson
ATTORNEY

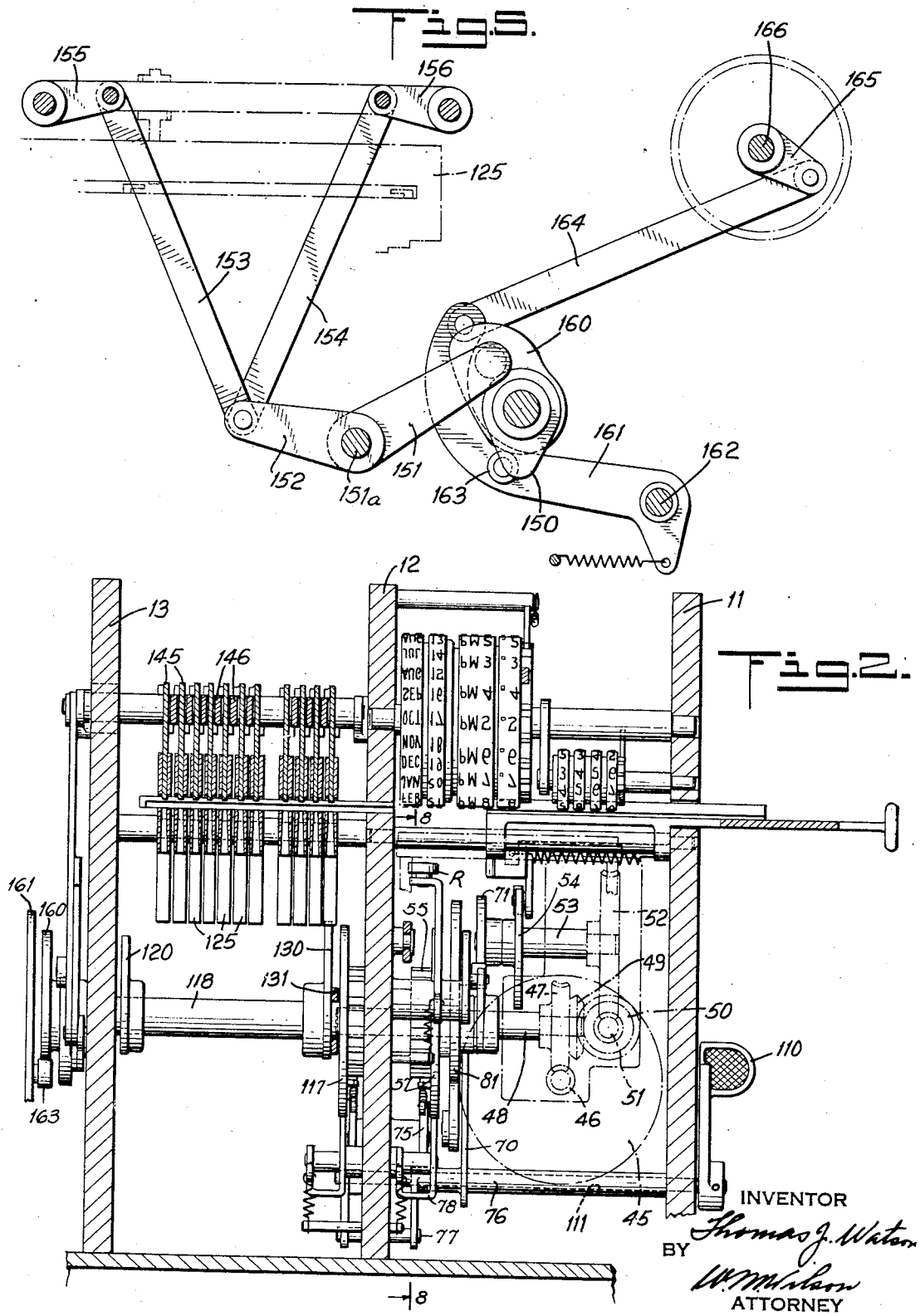

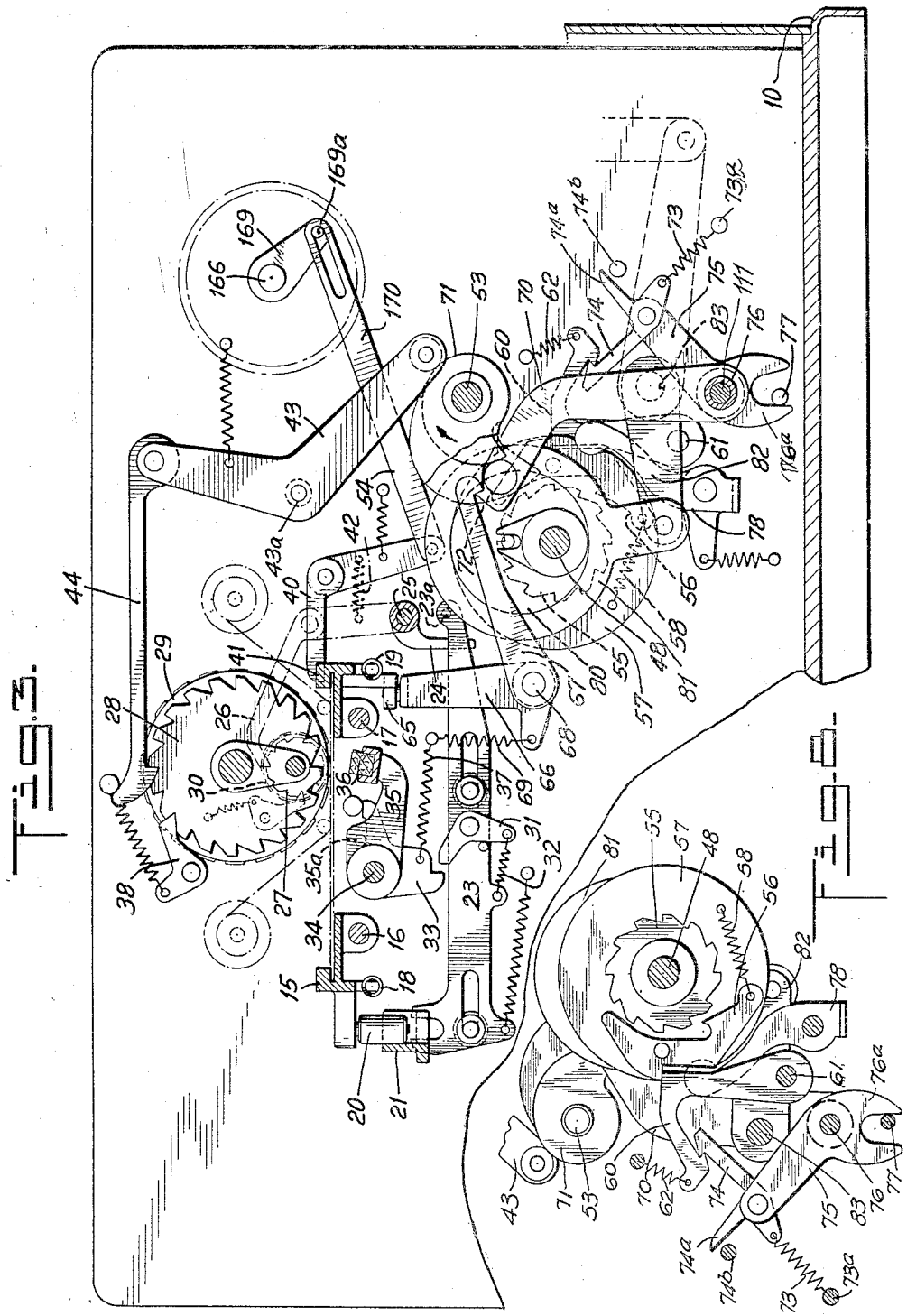

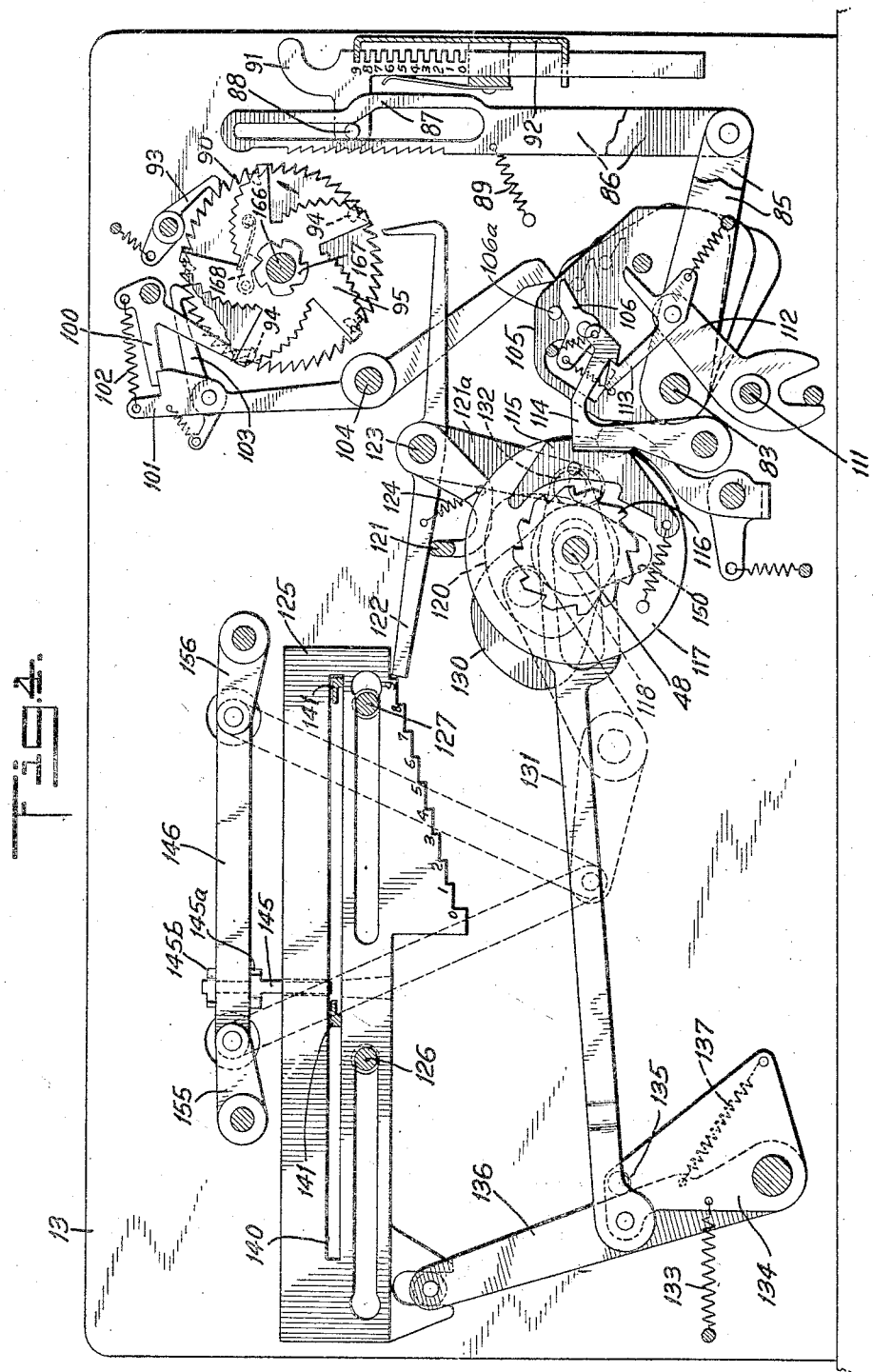

Feb. 23, 1943. T. J. WATSON 2,312,137
JOB COST RECORDER
Filed Aug. 30, 1941 5 Sheets-Sheet 5

| ELAPSED TIME | COST | BURDEN | STARTING TIME | SERIAL NO. | |
|---|---|---|---|---|---|
| 0 | | 0 | | | 0 |
| 1 | 0 | 0 | MAY 23 AM 8 .3 | 0 0 8 2 | 1 |
| 0 | | | | | 2 |
| 3 | 0 | | | | 3 |
| 4  0 | | | | | 4 |
| 5  0 | | | | | 5 |
| 6 | | 0 | | | 6 |
| 7 | 0 | | | | 7 |
| 8 | 0 | | | | 8 |
| 9 | | 0 | | | 9 |
| 1 2 3 4 5 6 7 8 | | | | | 80 |

R

"FINISH TIME CYCLE"   20  40  60  80  100  120  140  160  180  200  220  240  260  280  300  320  340

Cam Fingers

Punch Plates

Punches

Cam Zero Reset

INVENTOR
Thomas J. Watson
BY
ATTORNEY

Patented Feb. 23, 1943

2,312,137

UNITED STATES PATENT OFFICE 2,312,137

JOB COST RECORDER

Thomas J. Watson, New York, N. Y., assignor to International Business Machines Corporation, New York, N. Y., a corporation of New York Application August 30, 1941, Serial No. 408,972

11 Claims. (Cl. 234—43)

This invention relates to job time recorders and, more particularly, to recorders of the type which compute and record the cost as well as the elapsed time for individual jobs.

The instant invention has for its general object the provision of an improved job cost recorder which is simple in its design and cheap in its manufacture.

More specifically, an object of the invention is to provide a novel recorder unit for each individual employee which will compute the time spent by the employee on each job to which he is assigned and which will record the cost of the job along with the elapsed time and other pertinent information on an inserted record card. It is proposed to have part of such recordings in the form of printed characters and the remainder in the form of digit-representing perforations. Punching means is therefore provided and is controlled by a unique setup means working in conjunction with the computing means. The cards, when thus perforated, may be then placed in well known card-controlled tabulating machines to obtain various accounting reports.

Other objects of the invention will be pointed out in the following description and claims and illustrated in the accompanying drawings, which disclose, by way of example, the principle of the invention and the best mode, which has been contemplated, of appying that principle.

In the drawings:

Fig. 1 is a plan view of the machine with the top cover cut away to reveal the location of the various mechanical parts.

Fig. 2 is a sectional view taken approximately along line 2—2 of Fig. 1.

Fig. 3 is a section along line 3—3 of Fig. 1.

Fig. 4 is a section along line 4—4 of Fig. 1.

Fig. 5 is a section along line 5—5 of Fig. 1.

Fig. 8 is a sectional view on the line 8—8 of Fig. 2.

Figures 6, 7:
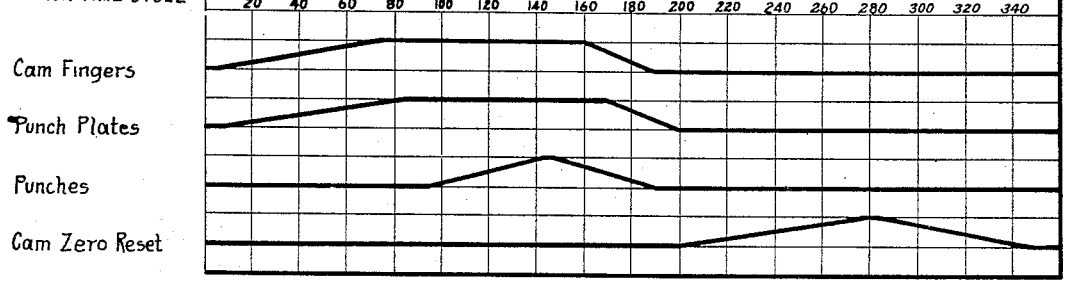
Fig. 6 is a front view of a record card used in the machine.
Fig. 7 is a time chart indicating the timings of the various cams included in the mechanism of the machine.

Referring now to the drawings, it will be seen that the machine is mounted on a base 10 and that the various mechanisms are supported generally by vertical frame members 11, 12 and 13 fastened to the base 10. It is contemplated to provide one complete machine such as disclosed herein for each individual employee to record the desired data in regard to various jobs performed by him.

In the proposed machine, a card receiver 15 is slidably mounted on guide rods 16 and 17 (Fig. 3) and is biased toward the outward position by a pair of springs 18 and 19. At the beginning of a job, the employee inserts a record card, such as the card R shown in Fig. 6, and the insertion is accompanied by sufficient pressure to move the entire receiver 15 inwardly against the action of springs 18 and 19.

As the receiver moves in, a roller 20 carried thereby cams against an arm 21, moving the arm to the left as viewed in Fig. 1. Arm 21 has one end pivoted at 22 to the side frame 11 and its other end engaging a slide 23, and thus the slide is also moved to the left. Slide 23 is loosely mounted on pins carried by the side frame 12. The right end of the slide has a pin 23a which engages the lower end of an arm 24 (Fig. 3) pivoted at 25 and provided with an upward extension 26 which cooperates with a type wheel ratchet 27 to move the ratchet one position. Associated with ratchet 27 and controlled thereby is a set of number wheels 30 which form a consecutive numbering device used to keep a record of the serial number of the job.

Slide 23 also carries a pivoted pawl 31 biased to the position shown by a spring 32. The upper end of pawl 31 engages the end of a bell crank lever 33 to rock the lever clockwise about shaft 34. Also mounted on shaft 34 is a platen arm 35 carrying the platen 36. It will be noted that arm 35 carries a pin 35a which rests on the upper edge of the bell crank. The operation is of the single print type in that pawl 31 by-passes the end of bell crank 33 to permit quick return of the bell crank 33 and, hence, the platen arm 34 by the action of return spring 37.

When the receiver 15 is fully inserted, a keeper 40 is urged into a slot 41 in the upper right side of the receiver by a spring 42 to lock the receiver in a position where it will remain during the time which the employee requires for the particular job.

A synchronous drive motor 45 (Fig. 2) is provided as the power means for machine operations to be described presently. The motor is connected through gearing 46, 47 with a shaft 48 which is in turn connected through gears 49, 50, 51 and 52 to shaft 53. The structure just recited comprises the continuously running drive mechanism of the machine. In the present embodiment, shaft 48 is driven at 10 R. P. M. and shaft 53 at 10 R. P. H or, in other words, a ratio of 60 to 1. Both shafts rotate in a clockwise direction, as viewed in Fig. 3. Shaft 52 carries a cam 54 which operates a cam follower arm 43 pivoted at 43a and connected to a pawl 44. Pawl 44 is moved back and forth once each 1/10 hr., stepping the type wheel ratchet 28 one position and also advancing the 1/10 hr. wheel 29 to which the ratchet is connected. The type wheels 29 are provided with suitable carry over mechanism, well known in the art, so as to always indicate the time of day. Thus, it is seen that the insertion of the card causes immediate printing of the starting time and serial number of the job in predetermined locations as shown in Fig. 7.

Fixed to shaft 48 is a ratchet 55 (Fig. 8) which forms one member of a clutch, the other member of which is a pawl 56 pivoted to a plate 57 and biased toward the ratchet 55 by a spring 58. Pawl 56 is normally held out of engagement with the ratchet by a latch member 60 pivoted at 61 and held normally in the substantially upright latching position by a spring 62.

Engagement of pawl 56 with ratchet 55 is possible only when the card receiver 15 has been moved to its inward position. A roller 65 is cammed to the left, as viewed in Fig. 3, causing leftward movement of a connected arm 66 and upward movement of a latch arm 67. Arms 66 and 67 are fastened to a shaft 68 and are normally biased to the right and down, respectively. It will be noted that as the card receiver is moved toward its inward position, arms 66 and 67 are rocked counterclockwise through a small angle against the pull of springs 69, and remain in that position as long as the card receiver is in.

An arm 70 is now released by removal of the hooked end of arm 67 from its end. The arm 70 is fixed to a tubular shaft 76 rockably mounted on a shaft 111 which is rotatably supported in frame plates 11 and 12. The tubular shaft 76 also has fixed to it an arm 75 to which a pawl 74 is pivotally attached. A spring 73 anchored on a stationary stud 73a pulls the whole latch operating unit comprising the pawl 74, arm 75, shaft 76, and arm 70 in clockwise direction, thereby holding a roller 72 on arm 70 against a cam 71 fixed on shaft 53. Once every tenth of an hour, roller 72 drops to the low part of cam 71 and the latch operating unit swings clockwise (Fig. 3), pulling the latch 60 out from the shoulder of pawl 56 which rocks into engagement with the continuously rotating ratchet wheel 55. An arm 74a on pawl 74 strikes a stop 74b and rocks the pawl counterclockwise, so that it releases the latch 60 after the latter has released the pawl 56. The plate 57 makes one complete revolution with the ratchet wheel 55 and is stopped by reengagement of the latch 60 with pawl 56. A spring biased detent 78 drops into a recess in plate 57 and holds the latter in position of rest. The rocking movement of the latch releasing unit is limited by a forked arm 76a of tubular shaft 76, which embraces a stationary stop 77.

Mounted on the face of the plate 57 is an eccentric cam 80 which is engaged by a follower ring 81 loosely connected to an arm 82. The arm 82 is fixed on shaft 83 which is rockably supported in frame plates 12 and 13. The effect of rotation of the eccentric 80 is to rock arm 82 up and down and thereby oscillate shaft 83. Between frame plates 12 and 13 shaft 83 has affixed to it a plurality of arms 85 (Fig. 4) which are moved upwardly as shaft 83 rocks in a counterclockwise direction. Arms 85 are connected to the lower ends of elapsed time and cost operating racks 86. As many arms 85 and racks 86 are provided as there are elapsed time, burden, and cost computing wheels 90. The three time controlled wheels 90 for the elapsed time are designated in Fig. 1 by the suffix a, the four cost wheels by the suffix b, and the four burden wheels by the suffix c. As the construction of the time controlled mechanism for operating the wheels 90 is the same for all wheels, only one of the mechanisms need be traced. It will be noted in Fig. 4 that rack 86 is provided with a cam slot 87 in which a pin 88 rides. The rack 86 is normally biased to the left by spring 89 and as rack 86 moves up it is cammed to the left into engagement with the related time controlled wheel 90. Pin 88 is attached to a settable arm 91 which is insertibly placed at selected positions in a bracket 92. The position at which arm 91 is set determines the period of time during which rack 86 engages wheel 90. In other words, the arm 91 is preset according to the rate, burden, or cost as the case may be. A spring-pressed detent 93 prevents backward movement of wheel 90. With this arrangement, the wheels 90b and 90c which are to compute the cost and burden of the job are moved to a definite multiple of the distance which the elapsed time wheels 90a are moved at each 1/10 hr. stepping period. Thus, the machines may be built standard and then adjusted merely by manual setting in accordance with the wage paid the employee and the share of the burden which the job must carry.

Attached to the rear face of each of the wheels 90 is a series of pins 94 displaced around the periphery thereof. These pins cooperate with the carryover levers, one unit of which will be described as representative. As an operating pin 94 strikes bell crank lever 100 the lever is cammed clockwise releasing latch arm 101 for movement to the right by a spring 102. A pawl 103 carried by the latch arm 101 engages a new tooth on the wheel 90 of the next higher denominational order. Arm 101 is pivoted at 104 and extends downwardly into the vicinity of a pawl 106 pivotally mounted on a plate 105 fixed to shaft 83. The pawl 106 is spring-biased against a stop 106a and is positioned so as to coact with the bottom end of lever 101 during the rocking of shaft 83, if the lever has been tripped. As the pawl 106 moves upward, it bypasses the bottom end of the lever 101 without effect, but on the down stroke it rocks the lever counterclockwise, moving the wheel 90 of the next higher order forward one step. This completes a carry from say the units order to the tens order, for example. The various pawls 106 are offset in position, so that whenever there is a simultaneous carry through more than one order the operations will occur in steps. This is illustrated in Fig. 4.

The operations described above occur while the card is in the machine, or in other words, while the employee is doing a particular job. It is now time to consider the operations which take place when the job has been completed. As the employee completes the job upon which he has been working he operates a finish lever 110 secured to the shaft 111 which extends through and supports the hollow shaft 76. Manual operation of lever 110 in a clockwise direction initiates a one revolution movement of another clutch mounted on shaft 48, similar in construction to the clutch first described which drives the plate 57. This second clutch comprises a ratchet wheel 116 fixed on shaft 48 and a pawl 115 pivoted to a plate 117 revolubly mounted on shaft 48. The pawl 115 is normally held out of engagement by a latch member 114, which can be released by a pawl 113 pivoted to an arm 112 fixed on shaft 111. The operation is the same as that of the first described clutch mechanism. Secured to the plate 117 and surrounding shaft 48 is a hollow shaft 118 (Fig. 2) which carries a plurality of finish time cycle cams which will now be described.

The first cam to come into effective operation, as illustrated by the upper line of the time chart (Fig. 7) is cam 120. This cam acting through an arm 121a, lowers a bail 121 on which rests a plurality of cam fingers 122. Fingers 122 are pivoted at 123 and are connected to the bail 121 by individual springs 124. The right end of each finger 122 is bent upwardly at right angles to cooperate with a star wheel 95 attached to the face of each of the wheels 90. The star wheels 95 have positioning steps on them which determine how far the right end of each of the fingers 122 may rise.

There are five identical segments to each of the star wheels 95 and these segments each have ten steps representing the ten digit positions. The left end of each of the cam fingers 122 cooperates with one of a plurality of punch plates 125, each of which is also provided with ten steps. The punch plates 125 are slidably mounted on a pair of shafts 126 and 127 which extend between side frames 12 and 13.

The second cam to take effective operation is a cam 130. This is the cam which controls the positioning of the punch plates and its operation is represented on the second line of the time chart. A cam follower 131 is provided with a roller 132 which rides on the periphery of cam 130 under the bias of a spring 133. The spring is connected to a plate 134 which, in turn, is joined with the left end of the cam follower 131. Plate 134 carries a bail 135 which extends across a plurality of arms 136 the upper ends of which are connected to the punch plates 125. Arms 136 are connected to plate 134 by individual springs 137. Thus as punch plates 125 are moved to the right by the movement initiated through cam 130, certain of the plates will be stopped sooner than others in view of the different positions of cam fingers 122. The plates which are stopped merely cause the stretching of their individual springs 137.

The punch plates 125 are each provided with an elongated, centrally located slot 140 through which the card passes, (the card actually being within a stationary card guide 141 fastened to frame member 12), as the card receiver 15 is moved to its inward position. A vertical slot is provided in each plate and is arranged to carry a punch element 145. Each punch element 145 is guided by a punch operating plate 146, the punch elements being slidably movable with respect to the plates 146. A pair of shoulders 145a and 145b are provided on each punch element to make its vertical or punching movement dependent upon the vertical movement of its connected plate 146.

Cam 150 (Fig. 5) is the next cam to become effective. This is the cam which brings about the actual operation of the punches by supplying vertical movement to the plate 146 through linkage comprising follower arm 151 pivoted by a stud 151a on the frame plate 13, arm 152 rigid with arm 151, and links 153 and 154. Arms 155 and 156 act as supports for the plate 146.

The card is thus perforated in predetermined locations in accordance with the different stopped positions of the punch elements. A typical card is shown in Fig. 6 where elapsed time, cost, and burden data are punched in the card. Cards so perforated may then be used in tabulating machines directly and totals taken to obtain desired accounting records.

The last of the aforementioned cams to operate is the reset cam 160. The mechanism associated with cam 160 is best illustrated in Fig. 5, where it is seen that an arm 161 pivoted at 162 is provided with a roller 163 which rides on the contour of cam 160 in such a manner that arm 161 is rocked up and down during the rotation of the cam. Connected to the upper end of arm 161 is a link 164 which connects with an arm 165 fastened to the shaft 166, the latter shaft being the shaft which supports the computing wheels 90 and the star wheels 95. It is obvious that the movement initiated by cam 160 will cause a rocking of shaft 166. In Fig. 4, it will be noted that shaft 166 has a ratchet 167 secured thereto. Each of the star wheels 95 has a detent pawl 168 which engages with ratchet 167 to position the star wheels uniformly. While the computing wheels 90 are being set by the time controlled mechanism, the pawls 168 are carried out of the notches in the ratchet 167 and move variable distances according to the distances which wheels 90 are moved. Thereafter shaft 166 is rotated counterclockwise which picks up the pawls 168 and carries the star wheels and the computing wheels 90 to a uniform position. At the other end of shaft 166 (Fig. 3) is an arm 169 which is connected by a link 170 to lever 40. The last operation which occurs is the movement of arm 170 to the left as a pin 169a engages the left end of the slot in the arm 170. This movement obviously will raise the upper end of bell crank lever 40 out of the slot 41 in the card receiver 15 and permits the receiver to return to the normal position under the urging of springs 18 and 19 in order that the operator may remove his card. The card at this time will have a complete record of the job including both printed and punched data as illustrated in Fig. 6.

While there have been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a job cost recorder having a plurality of elapsed time measuring devices and time controlled means for operating the same, a plurality of settable cam elements for adjusting the amplitude of movement of said devices by the time controlled means in a predetermined manner to represent cost data, a plurality of punching elements, means carried by the time measuring devices for controlling the selective positions of said punching elements, a card receiver adapted to receive a record card and operable to bring the card into punching relation with the punch elements, means controlled by the card receiver when operated to render the time controlled means effective, a manually operable lever, and means controlled by said lever to cause the positioned punch elements to perforate the card.

2. In a job cost recorder having a plurality of elapsed time measuring devices and time controlled means for operating the same, a plurality of settable cam elements for adjusting the amplitude of movement of said devices by the time controlled means in a predetermined manner to represent cost data, a plurality of punching elements, means carried by the time measuring devices for controlling the selective positions of said punching elements, a card receiver adapted to receive a record card and operable to bring the card into punching relation with the punch elements, means controlled by the card receiver when operated to render the time controlled means effective, a manually operable lever, means controlled by said lever to cause the positioned punch elements to perforate the card, and means also controlled by said lever for releasing the card receiver so as to remove the card from punching position and for resetting the elapsed time measuring devices.

3. In a job cost recorder having a plurality of elapsed time measuring devices and time controlled means for operating the same, a plurality of settable cam elements for adjusting the amplitude of movement of certain of said devices by the time controlled means in a predetermined manner to represent cost data, a plurality of punching elements, a plurality of stepped abutment members carried by the time measuring devices for controlling the selective positions of said punching elements, a card receiver adapted to receive a record card and movable to an operating position to bring the card into punching relation with the punch elements, means controlled by the card receiver when operated to render the time controlled means effective, a manually operable lever, means controlled by said lever to cause the positioned punch elements to perforate the card, and means also controlled by said lever for releasing the card receiver from the operating position and resetting all of the time measuring devices.

4. In a card controlled recording mechanism for recording the cost of individual jobs performed by a designated employee, a manually positionable card receiver for receiving a job card, said receiver having a normal and an operated position, a plurality of data accumulating elements, time controlled means rendered effective by the card receiver when moved to its operated position for initiating normal movement of said elements to represent elapsed time, means for maintaining said receiver in its operated position during the time required for a specified job, settable control means cooperating with the time controlled means to cause said accumulating elements to be moved to predetermined different multiples of the normal movement of said elements, a plurality of positionable punching elements and means for operating the some customarily at the completion of the job to perforate the card in the receiver, means carried by the accumulating elements for selectively positioning said punching elements with respect to the card so as to control the location of the perforations made in said card, thereby causing said perforations to represent the data set up on the accumulating elements, and means effective immediately following said punching operation to return the card receiver to the normal position so as to render the perforated job card accessible to the employee for removal from the receiver.

5. A card controlled recorder for recording the cost of individual jobs performed by a designated employee, comprising a manually positionable card receiver for receiving a job card, said receiver having a normal and an operated position, a plurality of normally idle data accumulating elements, time controlled means rendered effective by the card receiver when moved to its operated position for initiating normal movement of said elements to represent elapsed time, means for maintaining said receiver in its operated position normally until the finish of a specified job, settable control means cooperating with the time controlled means to cause said accumulating elements to be moved to predetermined different multiples of the normal movement of said elements, a plurality of positionable punching elements and means for operating the same customarily at the completion of the job to perforate the card in the receiver, a plurality of stepped abutment members carried by the accumulating elements and cam operated fingers cooperating therewith for selectively positioning said punching elements with respect to the card so as to control the location of the perforations made in said card, thereby causing said perforations to represent the data set up on the accumulating elements, and means effective immediately following said punching operation to return the card receiver to its normal position so as to render the perforated job card accessible to the employee for removal from the receiver.

6. A card controlled recorder for recording the cost of jobs performed by a designated employee, comprising a manually positionable card receiver for receiving a job card, said receiver having a normal and an operated position, a plurality of normally idle data accumulating elements, time controlled means rendered effective by the card receiver when moved to its operated position for initiating normal movement of said elements to measure elapsed time, means for maintaining said receiver in its operated position normally for the time required by the job, presettable camming devices cooperating with the time controlled means to cause said accumulating elements to be moved to predetermined different multiples of the normal movement of said elements, a plurality of positionable punching elements and means for operating the same customarily at the completion of the job to perforate the card in the receiver, and a plurality of stepped abutment members carried by the accumulating elements and cam operated feelers cooperating therewith for selectively positioning said punching elements with respect to the card so as to control the location of the perforations made in said card, thereby causing said perforations to represent the data set up on the accumulating elements.

7. In a card controlled cost recorder, a manually positionable card receiver for receiving a record card, said receiver having a normal and an operated position, a plurality of normally idle data accumulating wheels, time controlled means including a plurality of racks, one for each wheel rendered effective by the card receiver when moved to its operated position for engaging said wheels to cause said wheels normally to begin to measure elapsed time, means for maintaining said receiver in its operated position, a plurality of presettable cam members, one for each rack for increasing the engaging time of the racks with certain of the accumulating wheels in a predetermined ratio so as to cause said wheels to be moved predetermined multiples of the normal distance required for measuring the elapsed time, a plurality of positionable punching elements and means for operating the same to perforate the card in the receiver, means carried by the accumulating elements for selectively positioning said punching elements with respect to the card so as to control the location of the perforations made in said card, thereby causing said perforations to represent the data set up on the accumulating elements, and means effective upon completion of the punching operation for returning the card receiver to normal and resetting the accumulator wheels.

8. In a job cost recorder, a plurality of punching devices, a card receiver for insertibly receiving a record card, said receiver being movable so as to bring the card into punching position with respect to said devices, means acting on the receiver to hold the card in punching position, a plurality of data accumulating wheels, time controlled means normally initiating operation of said wheels to represent elapsed time when the card is moved into punching position, settable means cooperating with said time controlled means for changing the amplitude of movement of certain ones of said wheels in a predetermined ratio to the elapsed time to represent cost values, means carried by the accumulating wheels in accordance with the positions of said wheels for setting up the punch elements for operation, manually operated means for initiating operation of said punching elements to perforate the card, and means controlled by the last mentioned means for releasing the card receiver from its operated position and for resetting the accumulating wheels.

9. In a job cost recorder, a plurality of punching devices, a card receiver for insertibly receiving a record card, said receiver being movable so as to bring the card into punching position with respect to said devices, means acting on said receiver to hold the card in punching position, a plurality of data accumulating wheels, time controlled means normally initiating operation of said wheels to represent elapsed time when the card is moved into punching position, settable means cooperating with said time controlled means for changing the rate of movement of certain ones of said wheels by predetermined multiples with respect to the elapsed time to represent cost values, a stepped abutment member carried by each of the accumulating wheels in accordance with the positions of said wheel for conditioning related punch elements for operation, manually operated means for initiating operation of the conditioned punching elements to perforate the card, and means controlled by the last mentioned means for releasing the card receiver from its operated position and for resetting the accumulating wheels.

10. In a job cost recorder, a plurality of punching devices, a card receiver for insertibly receiving a record card, said receiver being movable so as to bring the card into punching position with respect to said devices, means acting on said receiver to hold the card in punching position, a plurality of data accumulating wheels, a movable rack associated with each of said wheels and engageable therewith, time controlled means normally initiating movement of said racks to cause operation of certain ones of the accumulating wheels at a normal uniform rate to represent elapsed time when the card is moved into punching position, settable means cooperating with said time controlled means for varying the rate of operation of others of said racks and wheels in a predetermined different multiple of the normal rate to represent cost values, means carried by the accumulating wheels in accordance with the positions of said wheels for setting up the punch elements for operation, manually operated means for initiating operation of said punching elements to perforate the card, and means controlled by the last mentioned means for releasing the card receiver from its operated position and for resetting the accumulating wheels.

11. In a job cost recorder, a plurality of punching devices, a card receiver for insertibly receiving a record card, said receiver being movable so as to bring the card into punching position with respect to said devices, means acting on said receiver to hold the card in punching position, a plurality of data accumulating wheels, a plurality of movable racks, one for each wheel, time controlled means normally initiating movement of said racks at a uniform rate, variably positioned cams for determining the time of engagement of the individual racks with their respective wheels and hence the differential extent of operation of said wheels by said racks, such extent of operation in each instance bearing a definite ratio to the elapsed time so as to represent cost values, means carried by the accumulating wheels in accordance with the positions of said wheels for setting up the punch elements for operation, manually operated means for initiating operation of said punching elements to perforate the card, and means controlled by the last mentioned means for releasing the card receiver from its operated position and for resetting the accumulating wheels.

THOMAS J. WATSON.